(12) United States Patent
Zhou et al.

(10) Patent No.: US 10,476,643 B2
(45) Date of Patent: Nov. 12, 2019

(54) RESOURCE CONFIGURATION METHOD AND APPARATUS OF REFERENCE SIGNAL AND COMMUNICATIONS SYSTEM

(71) Applicant: FUJITSU LIMITED, Kawasaki-shi, Kanagawa (JP)

(72) Inventors: Hua Zhou, Beijing (CN); Haibo Xu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/818,125

(22) Filed: Nov. 20, 2017

(65) Prior Publication Data

US 2018/0076940 A1    Mar. 15, 2018

Related U.S. Application Data

(63) Continuation of application No. PCT/CN2015/079541, filed on May 22, 2015.

(51) Int. Cl.
*H04L 5/00* (2006.01)
*H04W 16/28* (2009.01)
(Continued)

(52) U.S. Cl.
CPC ......... *H04L 5/0048* (2013.01); *H04B 7/0413* (2013.01); *H04B 7/063* (2013.01);
(Continued)

(58) Field of Classification Search
CPC ..... H04B 7/0413; H04B 7/063; H04L 5/0051; H04L 5/0053
See application file for complete search history.

(56) References Cited

U.S. PATENT DOCUMENTS 8,976,668 B2    3/2015 Yang et al.
9,271,295 B2    2/2016 Lee et al.
(Continued)

FOREIGN PATENT DOCUMENTS

CN    103001742 A    3/2013
CN    103716078 A    4/2014
(Continued)

OTHER PUBLICATIONS

"The First Examiner's Report" issued by Canadian Patent Office dated Jul. 26, 2018 for corresponding Canadian Patent Application No. 2,985,672.
(Continued)

*Primary Examiner* — Phuc H Tran
(74) *Attorney, Agent, or Firm* — Myers Wolin, LLC

(57) ABSTRACT

A resource configuration method and apparatus of reference signal and a communications system. The resource configuration method includes: configuring one or more resources by a base station for a first reference signal which is precoded with one or more beam weighting coefficients, and configuring one or more resources for a second reference signal which is not precoded with one or more beam weighting coefficients or precoding of which is unknown to a UE; and transmitting one or more resource configurations of the first reference signal and one or more resource configurations of the second reference signal to the UE. Hence, a 3D MIMO system may flexibly support reference signals of multiple types.

17 Claims, 8 Drawing Sheets

(51) Int. Cl.
*H04B 7/0413* (2017.01)
*H04B 7/06* (2006.01)

(52) U.S. Cl.
CPC ............ *H04L 5/005* (2013.01); *H04L 5/0051* (2013.01); *H04L 5/0053* (2013.01); *H04L 5/0091* (2013.01); *H04W 16/28* (2013.01); *H04B 7/0632* (2013.01); *H04B 7/0639* (2013.01)

(56) References Cited

U.S. PATENT DOCUMENTS

| | | | |
|---|---|---|---|
| 9,628,235 B2* | 4/2017 | Kishiyama | H04W 52/04 |
| 2013/0208689 A1 | 8/2013 | Kim et al. | |
| 2013/0223415 A1 | 8/2013 | Higuchi et al. | |
| 2015/0055723 A1 | 2/2015 | Kim et al. | |
| 2015/0180632 A1 | 6/2015 | Kishiyama et al. | |
| 2015/0270917 A1* | 9/2015 | Roman | H04J 11/005 370/329 |
| 2015/0282036 A1* | 10/2015 | Yi | H04L 5/001 370/332 |
| 2017/0006539 A1* | 1/2017 | Kakishima | H04B 7/0478 |
| 2017/0163320 A1* | 6/2017 | Nagata | H04B 7/0413 |
| 2017/0264412 A1* | 9/2017 | Chen | H04B 7/0626 |

FOREIGN PATENT DOCUMENTS

| | | |
|---|---|---|
| CN | 104604170 A | 5/2015 |
| EP | 2 894 801 A1 | 7/2015 |
| EP | 3 145 095 A1 | 3/2017 |
| JP | 2013-529872 A | 7/2013 |
| JP | 2014-53812 A | 3/2014 |
| JP | 2014-507844 A | 3/2014 |
| JP | 2015-503881 A | 2/2015 |
| RU | 2 456 744 C2 | 7/2012 |
| WO | 2014/017224 A1 | 1/2014 |
| WO | 2014/038347 A1 | 3/2014 |
| WO | 2014/081262 A1 | 5/2014 |
| WO | 2015/047333 A1 | 4/2015 |

OTHER PUBLICATIONS

International Search Report issued for corresponding International Patent Application No. PCT/CN2015/079541, dated Feb. 18, 2016, with an English translation.
Written Opinion of the International Searching Authority issued for corresponding International Patent Application No. PCT/CN2015/079541, dated Feb. 18, 2016, with an English translation.
Notification of Reasons for Refusal issued by the Japan Patent Office for corresponding Japanese Patent Application No. 2017-559297, dated Sep. 4, 2018, with an English translation.
Office Action issued by Rospatent Federal Service for Intellectual Property for corresponding Russian Patent Application No. 2017138091/07(066524), dated Jun. 9, 2018, with an English translation.
Search Report issued by Rospatent Federal Service for Intellectual Property for corresponding Russian Patent Application No. 2017138091/07(066524), dated Jun. 9, 2018, with an English translation.
Extended European search report with supplementary European search report and the European search opinion issued by the European Patent Office for corresponding European Patent Application No. 15892829.1, dated Nov. 26, 2018, and received by an individual under 37 CFR 1.56(c)(3) on Dec. 5, 2018, 2018.
Notice of Preliminary Rejection issued by the Korean Intellectual Property Office for corresponding Korean Patent Application No. 10-2017-7033758, dated Dec. 4, 2018, with an English translation.
Notice of Preliminary Rejection issued by the Korean Intellectual Property Office for corresponding Korean Patent Application No. 10-2017-7033758, dated May 24, 2019, with an English translation.
Communication of the substantive examination report by the Mexican Institute of Industrial Property issued for rresponding Mexican Patent Application No. MX/A/2017/014901 dated Jul. 5, 2019 with an English translation.

\* cited by examiner

501 a UE receives one or more resource configurations of a first reference signal which is precoded with one or more beam weighting coefficients and one or more resource configurations of a second reference signal which is not precoded with one or more beam weighting coefficients or precoding of which is unknown to the UE, transmitted by a base station

RESOURCE CONFIGURATION METHOD AND APPARATUS OF REFERENCE SIGNAL AND COMMUNICATIONS SYSTEM

CROSS REFERENCE TO RELATED APPLICATIONS

This application is a continuation application of International Application PCT/CN2015/079541 filed on May 22, 2015, the entire contents of which are incorporated herein by reference.

TECHNICAL FIELD

This disclosure relates to the field of communications technologies, and in particular to a resource configuration method and apparatus of reference signal and a communications system in a three-dimensional (3D) multiple input multiple output (MIMO) system.

BACKGROUND

As the development of antenna technologies, a large number of antennas may be arranged in a transmitting device. Three-dimensional beamforming technology of multiple antennas may improve antenna gains, and flexible configuration of beam widths and direction according to distribution of user equipments (UEs) may efficiently suppress white noises and inter-cell random interference and improve efficiency and reliability of system transmission, which is a hot candidate technology for future mobile communications systems.

For facilitating discovery and measurement by a UE, corresponding reference signals (RSs) are needed for guide, in which a channel state information reference signal (CSI-RS), a common reference signal (CRS), and a demodulation reference signal (DMRS), etc., are included.

Taking a CSI-RS as an example, the CSI-RS is defined in a long-term evolution (LTE) R10 system as being transmitted in a period and a fixed offset configured by the system. A base station may notify via high-layer signaling CSI-RS-Config which resource configuration and subframe configuration shall be adopted. Viewing from provisions in existing standards, when the base station configures resources of a CSI-RS via high-layer signaling, the base station will transmit the CSI-RS all the time according to corresponding periods and positions, unless the base station releases the resources of the CSI-RS again via high-layer signaling.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that in a 3D MIMO system, in order to better provide services to UEs, reference signals of different types are usually needed. And as the 3D MIMO technology is in an initial study stage, how to particularly define reference signals of different types and how to be compatible with reference signals of multiple types in the future have not been taken into account.

Embodiments of this disclosure provide a resource configuration method and apparatus of reference signal and a communications system, applicable to a 3D MIMO system to flexibly support reference signals of multiple types.

According to a first aspect of the embodiments of this disclosure, there is provided a resource configuration method of reference signal, applicable to a base station of a 3D MIMO system, the method including:

configuring, by a base station, one or more resources for a first reference signal which is precoded with one or more beam weighting coefficients, and configuring one or more resources for a second reference signal which is not precoded with one or more beam weighting coefficients or precoding of which is unknown to a user equipment (UE); and transmitting, by the base station, one or more resource configurations of the first reference signal and one or more resource configurations of the second reference signal to the UE.

According to a second aspect of the embodiments of this disclosure, there is provided a resource configuration apparatus of reference signal, configured in a base station of a 3D MIMO system, the apparatus including:

a resource configuration unit configured to configure one or more resources for a first reference signal which is precoded with one or more beam weighting coefficients, and to configure one or more resources for a second reference signal which is not precoded with one or more beam weighting coefficients or precoding of which is unknown to a UE; and a configuration transmitting unit configured to transmit one or more resource configurations of the first reference signal and one or more resource configurations of the second reference signal to the UE.

According to a third aspect of the embodiments of this disclosure, there is provided a resource configuration method of reference signal, applicable to a UE of a 3D MIMO system, the method including:

receiving, by a UE, one or more resource configurations of a first reference signal which is precoded with one or more beam weighting coefficients and one or more resource configurations of a second reference signal which is not precoded with one or more beam weighting coefficients or precoding of which is unknown to the UE, transmitted by a base station.

According to a fourth aspect of the embodiments of this disclosure, there is provided a resource configuration apparatus of reference signal, configured in a UE of a 3D MIMO system, the apparatus including:

a configuration receiving unit configured to receive one or more resource configurations of a first reference signal which is precoded with one or more beam weighting coefficients and one or more resource configurations of a second reference signal which is not precoded with one or more beam weighting coefficients or precoding of which is unknown to the UE, transmitted by a base station.

According to a fifth aspect of the embodiments of this disclosure, there is provided a communications system, including:

a base station configured to configure one or more resources for a first reference signal which is precoded with one or more beam weighting coefficients, configure one or more resources for a second reference signal which is not precoded with one or more beam weighting coefficients or precoding of which is unknown to a UE, and transmit one or more resource configurations of the first reference signal and one or more resource configurations of the second reference signal; and the UE configured to receive the one or more resource configurations of the first reference signal and the one or more resource configurations of the second reference signal.

According to another aspect of the embodiments of this disclosure, there is provided a computer readable program code, which, when executed in a base station, will cause a computer unit to carry out the resource configuration method of reference signal as described above in the base station.

According to a further aspect of the embodiments of this disclosure, there is provided a computer readable medium, including a computer readable program code, which will cause a computer unit to carry out the resource configuration method of reference signal as described above in a base station.

According to still another aspect of the embodiments of this disclosure, there is provided a computer readable program code, which, when executed in a UE, will cause a computer unit to carry out the resource configuration method of reference signal as described above in the UE.

According to yet another aspect of the embodiments of this disclosure, there is provided a computer readable medium, including a computer readable program code, which will cause a computer unit to carry out the resource configuration method of reference signal as described above in a UE.

An advantage of the embodiments of this disclosure exists in that the base station configures one or more resources for a first reference signal which is precoded with one or more beam weighting coefficients, and configures one or more resources for a second reference signal which is not precoded with one or more beam weighting coefficients or precoding of which is unknown to a UE. Hence, a 3D MIMO system may flexibly support reference signals of multiple types.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In a 3D MIMO system, beams may change along with positions of a UE, so as to provide relatively good services for the UE. In order to be suitable for UEs at different positions, beams of very narrow widths may be used; however, such beams are unable to completely cover all UEs within a cell. And furthermore, beams of very wide widths even beams of full angles may be used, which may cover all UEs within a cell.

In order to facilitate discovery and measurement by the UE, corresponding reference signals are needed for guide, no matter whether the beams are narrow beams or wide beams. The following embodiments shall be described by taking a CSI-RS as an example; however, this disclosure is not limited thereto. For example, other reference signals may also be used.

Embodiment 1

Figure 1:
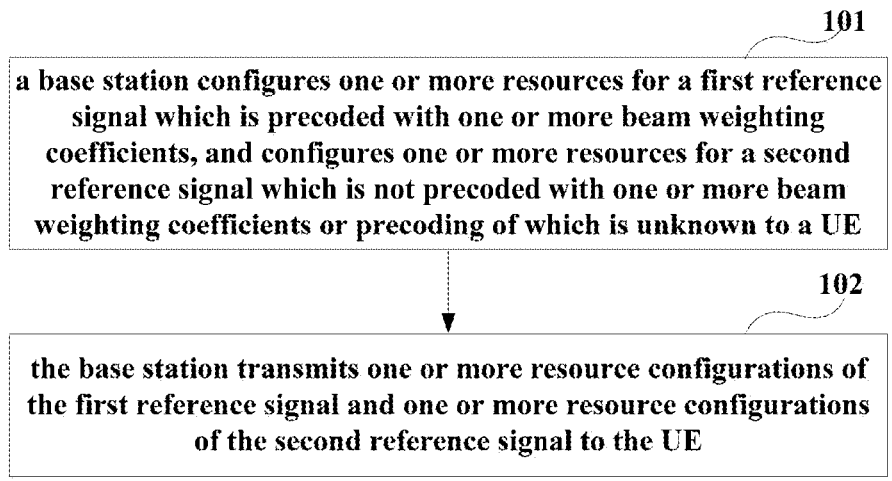
FIG. 1 is a flowchart of the resource configuration method of Embodiment 1 of this disclosure.

The embodiment of this disclosure provides a resource configuration method of reference signal, applicable to a base station of a 3D MIMO system. FIG. 1 is a flowchart of the resource configuration method of the embodiment of this disclosure. As shown in FIG. 1, the method includes:

block 101: a base station configures one or more resources for a first reference signal which is precoded with one or more beam weighting coefficients, and configures one or more resources for a second reference signal which is not precoded with one or more beam weighting coefficients or precoding of which is unknown to a UE; and block 102: the base station transmits one or more resource configurations of the first reference signal and one or more resource configurations of the second reference signal to the UE.

In this embodiment, for narrow beams, the system may use the first reference signal which is precoded with one or more beam weighting coefficients (such as a beamformed CSI-RS); the UE knows that the first reference signal is precoded with the beam weighting coefficients. For wide beams, the system may use the second reference signal which is not precoded with the beam weighting coefficients (such as a non-precoded CSI-RS). And furthermore, the system may also use the second reference signal precoding of which is unknown to the UE (or needing not to be known). That is, the second reference signal may be a reference signal that is completely not precoded, or may be a reference signal that is precoded, but the UE does not know that the second reference signal is precoded.

In this embodiment, the number of the first reference signal may be one or more, and the number of the second reference signal may be one or more. And in the following embodiments, the second reference signal shall be described by taking a non-precoded CSI-RS as an example only.

Figure 2:
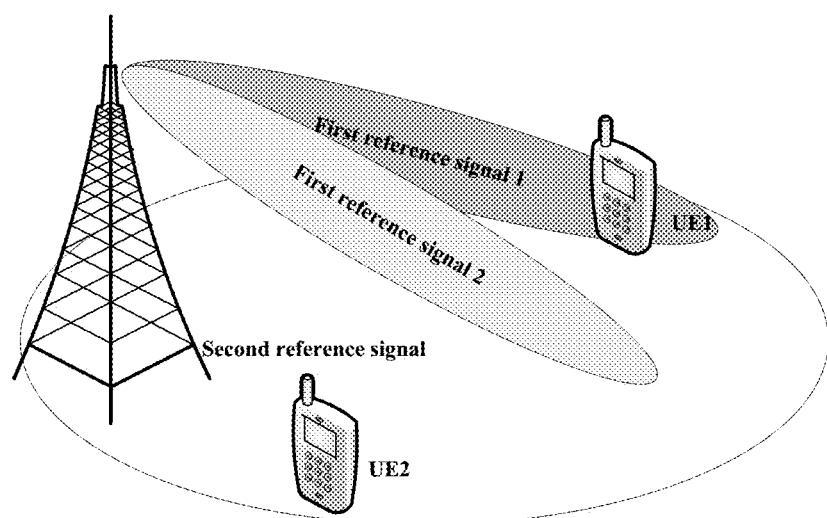
FIG. 2 is a schematic diagram of covering different UEs by multiple types of CSI-RSs of Embodiment 1 of this disclosure.

FIG. 2 is a schematic diagram of covering different UEs by multiple types of CSI-RSs of the embodiment of this disclosure. As shown in FIG. 2, UE 1 may receive signals transmitted via a first reference signal 1 (beamformed CSI-RS 1), and may also possibly receive a part of signals transmitted via a first reference signal 2 (beamformed CSI-RS 2), hence, UE 1 may measure two CSI-RSs and select a CSI-RS of best channel quality. and for UE 2, as beam directions of two narrow-beam CSI-RS 1 and CSI-RS 2 are relatively far away from it, it may only be covered by other reference signals, such as the second reference signal (a non-precoded CSI-RS) transmitted by a base station, thereby assisting UE 2 in measuring channels.

The configurations of the two types of CSI-RSs (i.e. the beamformed CSI-RS and the non-precoded CSI-RS) shown in FIG. 2 may enable UEs at different positions to be covered by signals of the base station, so that the UEs respectively feed back suitable channel quality information, such as a precoding matrix indicator (PMI), or a channel quality indicator (CQI), or a rank indicator (RI), etc. The two types of CSI-RSs may be distinguished by such parameters as a resource (a time resource and/or a frequency resource) position, a period, and a port, etc.

In this embodiment, a list of correspondence between types of CSI-RSs and such parameters as a time-frequency resource, a period, and a port, etc., may be predefined, so that the UE performs corresponding measurement after receiving a corresponding CSI-RS. For the beamformed CSI-RS, beam information (such as a beam index, or other parameters denoting beams) may be corresponded to such parameters as a time-frequency resource, a period, and a port, etc. It should be noted that the above parameters are not limited thereto, and particular parameters may be determined according to an actual scenario.

For example, whether a received CSI-RS is a beamformed CSI-RS or a non-precoded CSI-RS may be determined by the UE according to information on a port of the detected CSI-RS. When the CSI-RS is determined as a beamformed CSI-RS, a corresponding beam index may further be obtained. However, this disclosure is not limited thereto, and a type of a CSI-RS may be determined according to any one of such parameters as a time-frequency resource, a period, and a port, etc., or any combination thereof.

In this embodiment, the list of correspondence between types of CSI-RSs and such parameters as a time-frequency resource, a period, and a port, etc., may be statically agreed between the base station and the UE, and may also be configured by the base station via high-layer signaling, thereby dynamically or semi-dynamically adjusting the corresponding information.

In this embodiment, for the first reference signal, after the one or more resource configurations of the first reference signal is/are transmitted, the UE may be triggered or activated via signaling to report the measurement result of the first reference signal, and transmit the first reference signal at the same time (or in advance by a certain amount). And for the second reference signal, it may be transmitted while the one or more resource configurations of the second reference signal is/are transmitted.

That is, the base station may configure and transmit multiple non-zero power CSI-RSs; configuring and transmitting of one CSI-RS may be performed at the same time. This CSI-RS is a non-precoded CSI-RS, and is used by all UEs within coverage of the base station for channel measurement. And configuring and transmitting of another CSI-RS is performed separately, the transmitting of the CSI-RS is triggered or activated via signaling; this CSI-RS is a beamformed CSI-RS, and is used by a part of UEs for channel measurement.

For example, for the non-precoded CSI-RS, the configuring and transmitting is performed at the same time. Taken into account that the beamformed CSI-RS may be flexibly configured, a process of transmitting the beamformed CSI-RS by the base station may be divided into two steps: one is configuring one or more CSI-RS resources, and the other is transmitting the CSI-RS. For the beamformed CSI-RS, after the one or more CSI-RS resources is/are configured, activation by media access control (MAC) layer signaling or triggering by downlink control information (DCI) in physical layer signaling PDCCH is awaited, thereby transmitting the beamformed CSI-RS by a certain amount in advance, and ensuring that the UE may detect the beamformed CSI-RS in receiving the triggering or activation signaling.

In one implementation, the non-precoded CSI-RS is a reference signal configured by the base station and transmitted periodically; for example, a resource position and a period of the reference signal are configured via high-layer signaling, such as radio resource control (RRC) signaling. And the beamformed CSI-RS is a reference signal respectively configured and triggered (or activated) by the base station and transmitted periodically; for example, a resource position, a period and/or a duration of the reference signal are configured via high-layer signaling (such as RRC signaling), and the UE is notified via an MAC signaling to trigger or activate a measurement report of the beamformed CSI-RS.

In another implementation, the non-precoded CSI-RS is a reference signal configured by the base station and transmitted periodically; for example, a resource position and a period of the reference signal are configured via high-layer signaling (such as RRC signaling). And the beamformed CSI-RS is a reference signal respectively configured and triggered (or activated) by the base station and transmitted periodically; for example, a resource position, a period and/or a duration of the reference signal are configured via high-layer signaling (such as RRC signaling), and the UE is notified via physical layer signaling, such as a physical downlink control channel (PDCCH), to trigger or activate a measurement report of the beamformed CSI-RS.

In a further implementation, the non-precoded CSI-RS is a reference signal configured by the base station and transmitted periodically; for example, a resource position and a period of the reference signal are configured via high-layer signaling (such as RRC signaling). And the beamformed CSI-RS is a reference signal respectively configured and triggered (or activated) by the base station and transmitted aperiodically; for example, a resource position, the number of times of transmission and/or a duration of the reference signal are configured via high-layer signaling (such as RRC signaling), and the UE is notified via an MAC signaling to trigger or activate a measurement report of the beamformed CSI-RS.

In still another implementation, the non-precoded CSI-RS is a reference signal configured by the base station and transmitted periodically; for example, a resource position and a period of the reference signal are configured via high-layer signaling (such as RRC signaling). And the beamformed CSI-RS is a reference signal respectively configured and triggered (or activated) by the base station and transmitted aperiodically; for example, a resource position, the number of times of transmission and/or a duration of the reference signal are configured via high-layer signaling (such as RRC signaling), and the UE is notified via physical layer signaling (such as a PDCCH) to trigger or activate a measurement report of the beamformed CSI-RS.

In this embodiment, after configuring the CSI-RSs, the base station may, as demanded, further notify the UE to perform periodic or aperiodic channel measurement feedback.

In one implementation, when the UE is triggered or activated via the MAC signaling to report a measurement result of the first reference signal, the UE is notified to perform periodic or aperiodic channel measurement feedback on the first reference signal. And the UE is notified via high-layer signaling to perform periodic feedback on the second reference signal, or the UE is notified via physical layer signaling to perform aperiodic feedback on the second reference signal.

For example, for the beamformed CSI-RS, while transmitting the beamformed CSI-RS (which may be transmitted in advance by a certain amount), the base station may activate the UE via MAC signaling to report a measurement result of the beamformed CSI-RS, and notify the UE to perform periodic or aperiodic CQI feedback.

For the non-precoded CSI-RS, the base station triggers, via high-layer signaling, periodic CQI feedback (which may further include one or more PMIs, and one or more RIs, etc.), or triggers, via physical layer signaling (such as a PDCCH), aperiodic feedback.

In another implementation, when the UE is triggered or activated via the physical layer signaling to report a measurement result of the first reference signal, the UE is notified to perform periodic or aperiodic channel measurement feedback on the first reference signal. And the UE is notified via high-layer signaling to perform periodic feedback on the second reference signal, or the UE is notified via physical layer signaling to perform aperiodic feedback on the second reference signal.

For example, for the non-precoded CSI-RS, the base station triggers, via high-layer signaling, periodic CQI feedback (which may further include one or more PMIs, and one or more RIs, etc.), or triggers, via physical layer signaling (such as a PDCCH), aperiodic feedback.

For the beamformed CSI-RS, in transmitting the beamformed CSI-RS (which may be transmitted in advance by a certain amount), the base station may notify the UE to perform periodic or aperiodic CQI feedback while triggering the UE via physical layer signaling (such as a PDCCH) to report a measurement result of the beamformed CSI-RS.

Figure 3:
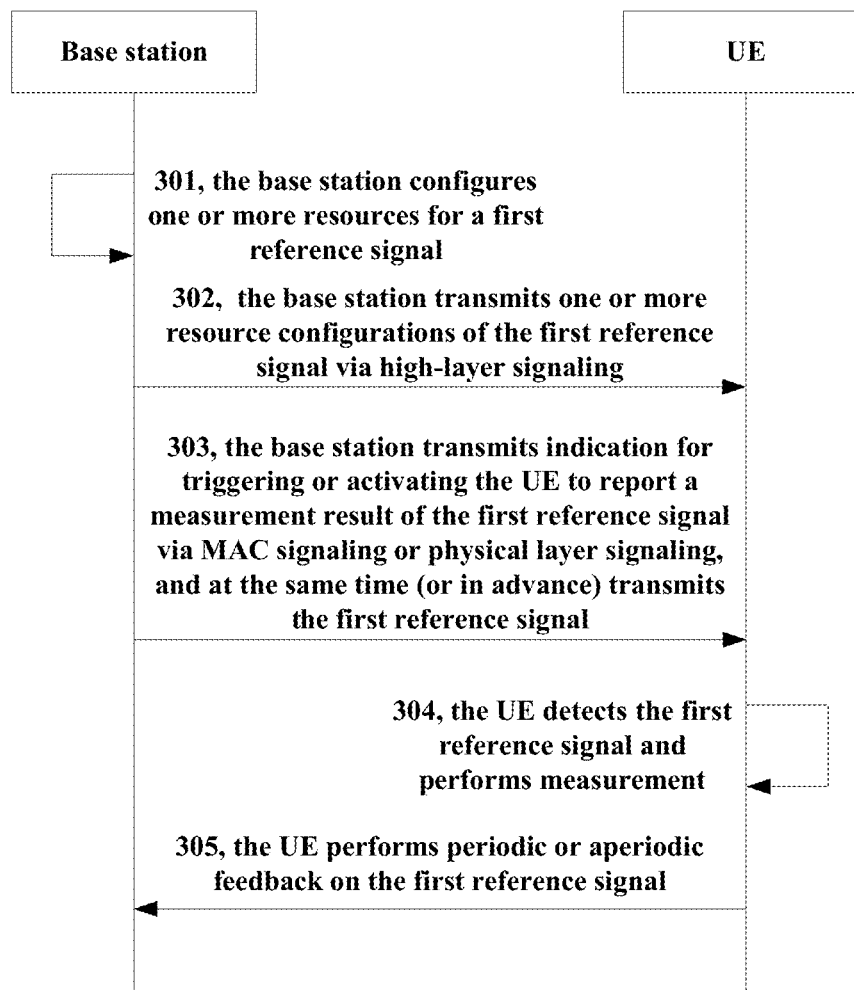
FIG. 3 is another flowchart of the resource configuration method of Embodiment 1 of this disclosure.

FIG. 3 is another flowchart of the resource configuration method of the embodiment of this disclosure, in which a case of the first reference signal is schematically shown. As shown in FIG. 3, the method includes:

301: the base station configures one or more resources for a first reference signal which is precoded with one or more beam weighting coefficients;

302: the base station transmits one or more resource configurations of the first reference signal via high-layer signaling;

303: the base station transmits indication for triggering or activating the UE to report a measurement result of the first reference signal via MAC signaling or physical layer signaling, and at the same time (or in advance), transmits the first reference signal;

304: the UE detects the first reference signal and performs measurement; and

305: the UE performs periodic or aperiodic feedback on the first reference signal.

Figures 4, 5:
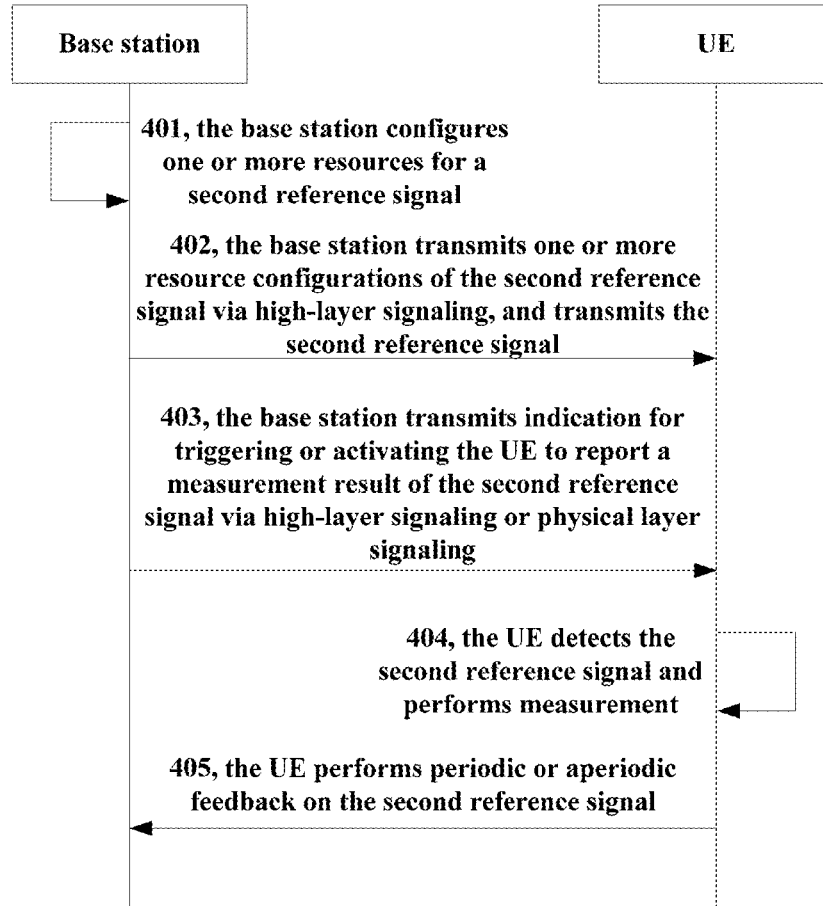
FIG. 4 is a further flowchart of the resource configuration method of Embodiment 1 of this disclosure.
FIG. 5 is a flowchart of the resource configuration method of Embodiment 2 of this disclosure.

FIG. 4 is a further flowchart of the resource configuration method of the embodiment of this disclosure, in which a case of the second reference signal is schematically shown. As shown in FIG. 4, the method includes:

401: the base station configures one or more resources for a second reference signal which is not precoded with one or more beam weighting coefficients;

in this embodiment, the second reference signal may be a signal that is not precoded with one or more beam weighting coefficients, alternatively may also be a signal that is precoded with one or more beam weighting coefficients (but its precoding is unknown to the UE);

402: the base station transmits one or more resource configurations of the second reference signal via high-layer signaling, and transmits the second reference signal;

403: the base station transmits indication for triggering or activating the UE to report a measurement result of the second reference signal via high-layer signaling or physical layer signaling;

404: the UE detects the second reference signal and performs measurement; and

405: the UE performs periodic or aperiodic feedback on the second reference signal.

It should be noted that the cases of the first reference signal the second reference signal are only schematically shown in FIGS. 3 and 4; however, this disclosure is not limited thereto. For example, an order of executing the steps may be appropriately adjusted, and one or more steps therein may be added or deleted.

It can be seen from the above embodiment that the base station configures one or more resources for a first reference signal which is precoded with one or more beam weighting coefficients, and configures one or more resources for a second reference signal which is not precoded with one or more beam weighting coefficients or precoding of which is unknown to a UE. Hence, a 3D MIMO system may flexibly support reference signals of multiple types.

Embodiment 2

The embodiment of this disclosure provides a resource configuration method of reference signal, applicable to a UE of a 3D MIMO system, with contents identical to those in Embodiment 1 being not going to be described herein any further.

FIG. 5 is a flowchart of the resource configuration method of the embodiment of this disclosure. As shown in FIG. 5, the method includes:

block 501: a UE receives one or more resource configurations of a first reference signal which is precoded with one or more beam weighting coefficients and one or more resource configurations of a second reference signal which is not precoded with one or more beam weighting coefficients or precoding of which is unknown to the UE, transmitted by a base station.

The first reference signal and the second reference signal shall be described below respectively.

Figure 6:
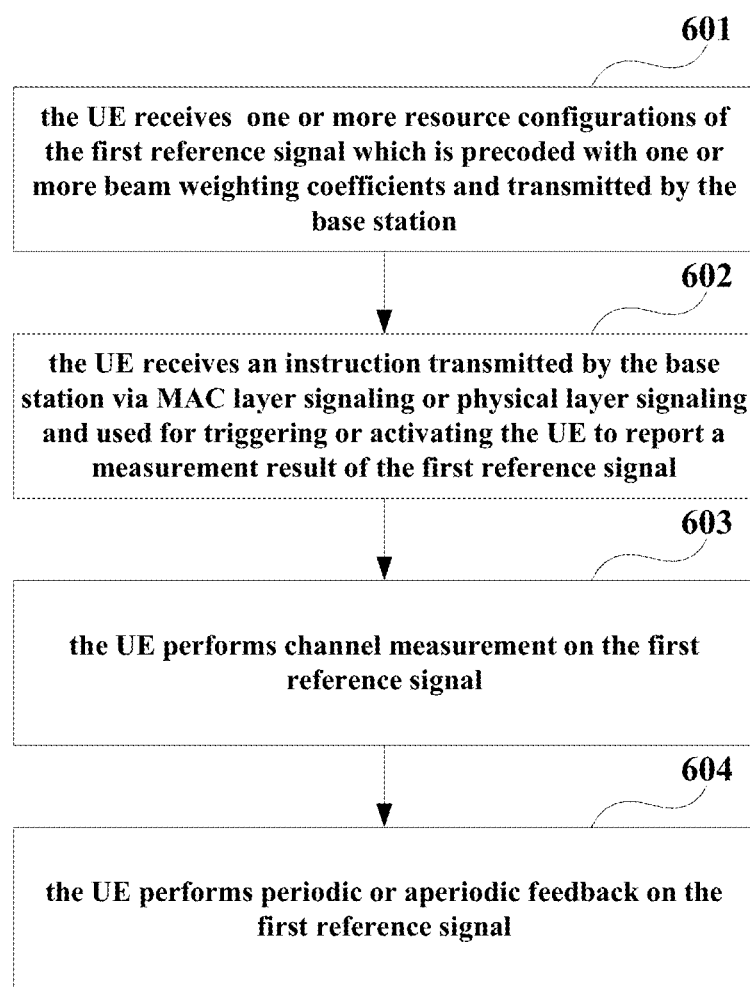
FIG. 6 is another flowchart of the resource configuration method of Embodiment 2 of this disclosure.

FIG. 6 is another flowchart of the resource configuration method of the embodiment of this disclosure, in which a case of the first reference signal is schematically shown. As shown in FIG. 6, the method includes:

block 601: the UE receives one or more resource configurations of the first reference signal which is precoded with one or more beam weighting coefficients and transmitted by the base station;

block 602: the UE receives an instruction transmitted by the base station via MAC layer signaling or physical layer signaling and used for triggering or activating the UE to report a measurement result of the first reference signal;

block 603: the UE performs channel measurement on the first reference signal; and block 604: the UE performs periodic or aperiodic feedback on the first reference signal.

For example, after detecting beamformed CSI-RSs, the UE may select a CSI-RS of a best channel condition from the CSI-RSs (for example, there may be one or more CSI-RSs of different beam directions) and perform feedback. Contents that are fed back may include beam indices to which the one or more CSI-RSs correspond, or other parameters denoting the beams (such as a port, and a resource, etc.), and corresponding information, such as information on CQI and/or RI, etc.

Figure 7:
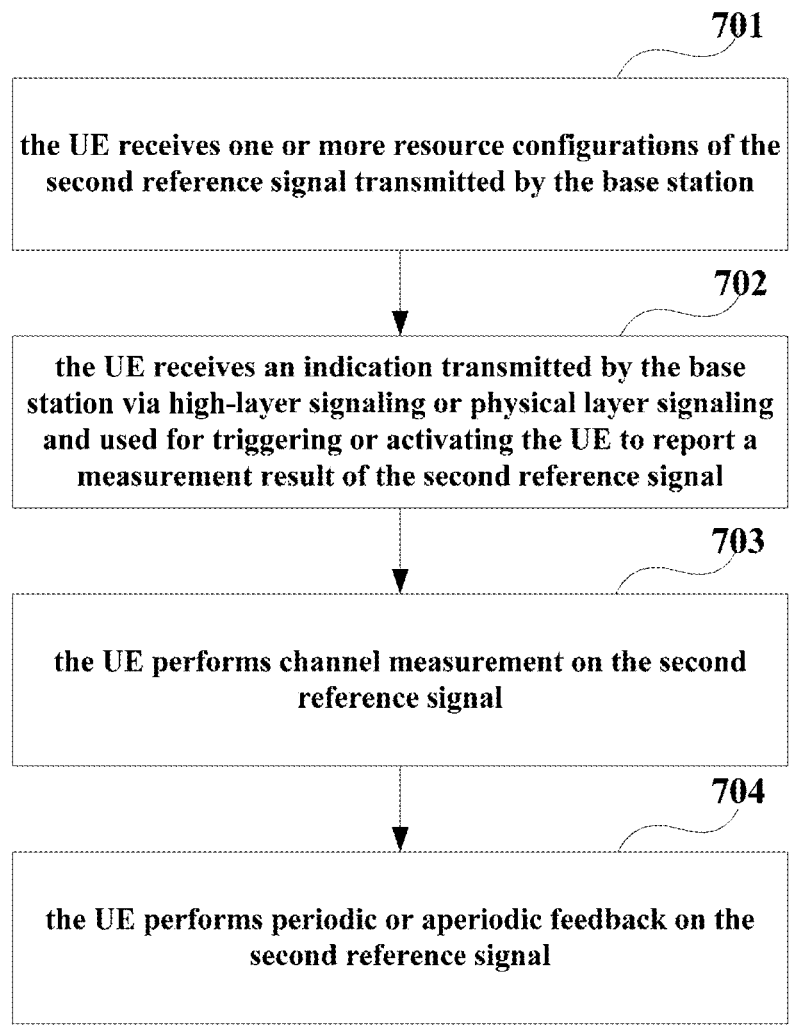
FIG. 7 is a further flowchart of the resource configuration method of Embodiment 2 of this disclosure.

FIG. 7 is a further flowchart of the resource configuration method of the embodiment of this disclosure, in which a case of the second reference signal is schematically shown. As shown in FIG. 7, the method includes:

block 701: the UE receives one or more resource configurations of the second reference signal transmitted by the base station;

in this embodiment, the second reference signal may be a signal that is not precoded with one or more beam weighting coefficients, and may also be a signal that is precoded with one or more beam weighting coefficients (but its precoding is unknown to the UE);

block 702: the UE receives an indication transmitted by the base station via high-layer signaling or physical layer signaling and used for triggering or activating the UE to report a measurement result of the second reference signal;

block 703: the UE performs channel measurement on the second reference signal; and block 704: the UE performs periodic or aperiodic feedback on the second reference signal.

For example, after detecting non-precoded CSI-RSs, in performing measurement based on the CSI-RSs, the UE may, according to a precoding structure W=W1W2, estimate PMIs needing to be fed back; where, W1 and W2 denote different PMIs, such as in a vertical dimension and a horizontal dimension, etc., values of which being taken respectively from predefined codebooks, and W denotes a precoding matrix used by the base station in performing data transmission assumed by a UE side. After performing PMI estimation, the UE may calculate corresponding information on CQI and/or RI, and then perform needed channel feedback.

It should be noted that the operations at the UE side are only schematically shown in FIGS. 5-7; however, this disclosure is not limited thereto. For example, an order of executing the steps may be appropriately adjusted, and one or more steps therein may be added or deleted. And other steps related to the base station are not shown.

In this embodiment, feedback of the first reference signal and/or the second reference signal by the UE may have different priorities.

In one implementation, the UE may perform feedback according to the following priorities: aperiodic feedback for the first reference signal, periodic feedback for the first reference signal, aperiodic feedback for the second reference signal, and periodic feedback for the second reference signal.

For example, if collision occurs when CQIs to which two types of CSI-RSs correspond are fed back in corresponding uplink feedback channels, such as a physical uplink control channel (PUCCH) or a physical uplink shared channel (PUSCH), the CQIs shall be transmitted according to the following priorities (in a descending order):

aperiodic CQI report based on beamformed CSI-RS measurement;

periodic CQI report based on beamformed CSI-RS measurement;

aperiodic CQI report based on non-precoded CSI-RS measurement; and periodic CQI report based on non-precoded CSI-RS measurement.

In another implementation, the UE may perform feedback according to the following priorities: aperiodic feedback for the first reference signal, aperiodic feedback for the second reference signal, periodic feedback for the first reference signal, and periodic feedback for the second reference signal.

For example, if collision occurs when CQIs to which two types of CSI-RSs correspond are fed back in corresponding uplink feedback channels (such as a PUCCH or a PUSCH), the CQIs shall be transmitted according to the following priorities (in a descending order):

aperiodic CQI report based on beamformed CSI-RS measurement;

aperiodic CQI report based on non-precoded CSI-RS measurement;

periodic CQI report based on beamformed CSI-RS measurement; and periodic CQI report based on non-precoded CSI-RS measurement.

In this embodiment, by separating the resource configuration of the CSI-RSs from actual transmission of the CSI-RSs, the system may be enabled to support transmission of the first type of CSI-RS (beamformed CSI-RS) and the second type of CSI-RS (non-precoded CSI-RS). The base station simultaneously configures and transmits the second type of CSI-RS to cover a large range, configures the first type of CSI-RS and flexibly activates transmission of the CSI-RS via signaling as demanded by the system. At a receiving device, the UE performs CQI measurement and feedback according to the signaling, and performs the CQI feedback according to the predetermined priorities when there exists collision in the CQI feedback report. Hence, reference signals of multiple beam widths and corresponding CQI feedback may be flexibly supported.

Embodiment 3

The embodiment of this disclosure provides a resource configuration apparatus of reference signal, configured in a base station of a 3D MIMO system, with contents identical to those in Embodiment 1 being not going to be described herein any further.

Figure 8:
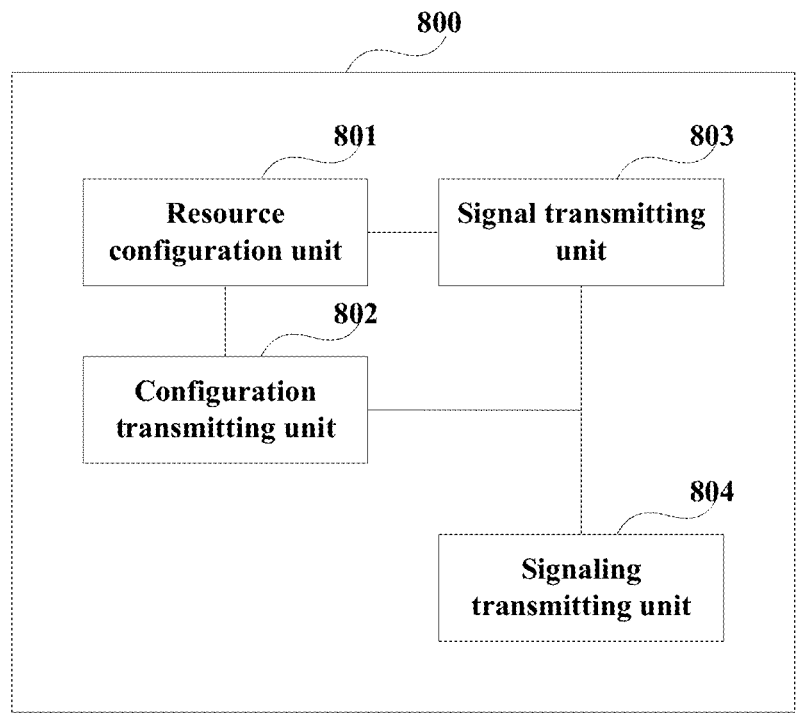
FIG. 8 is a schematic diagram of the resource configuration apparatus of Embodiment 3 of this disclosure.

FIG. 8 is a schematic diagram of the resource configuration apparatus of the embodiment of this disclosure. As shown in FIG. 8, a resource configuration apparatus 800 includes:

a resource configuration unit 801 configured to configure one or more resources for a first reference signal which is precoded with one or more beam weighting coefficients, and to configure one or more resources for a second reference signal which is not precoded with one or more beam weighting coefficients or precoding of which is unknown to a UE; and a configuration transmitting unit 802 configured to transmit one or more resource configurations of the first reference signal and one or more resource configurations of the second reference signal to the UE.

In this embodiment, the first reference signal and the second reference signal may be distinguished by one piece of the following information or any combination thereof: a time-frequency resource position, a period and a port. However, this disclosure is not limited thereto, and they may also be distinguished by using other information.

As shown in FIG. 8, the resource configuration apparatus 800 may further include:

a signal transmitting unit 803 configured to transmit the first reference signal by signaling triggering or activation after transmitting the one or more resource configurations of the first reference signal, and transmit the second reference signal in transmitting the one or more resource configurations of the second reference signal.

As shown in FIG. 8, the resource configuration apparatus 800 may further include:

a signaling transmitting unit 804 configured to transmit signaling for triggering or activating the UE to report a measurement result of the first reference signal.

In this embodiment, the configuration transmitting unit 802 may be configured to transmit the one or more resource configurations of the first reference signal and the one or more resource configurations of the second reference signal via high-layer signaling.

In this embodiment, the signal transmitting unit 803 may be configured to periodically transmit the second reference signal, and the signal transmitting unit 803 may be configured to periodically or aperiodically transmit the first reference signal.

In one implementation, the signaling transmitting unit 804 may be configured to, via MAC layer signaling or physical layer signaling, trigger or activate the UE to report a measurement result of the first reference signal.

In one implementation, the signaling transmitting unit 804 may further be configured to notify the UE via high-layer signaling to perform periodic feedback on the second reference signal, or notify the UE via physical layer signaling to perform aperiodic feedback on the second reference signal.

In one implementation, the signaling transmitting unit 804 may further be configured to, in triggering or activating via the MAC layer signaling the UE to report the measurement result of the first reference signal, notify the UE to perform periodic or aperiodic feedback on the first reference signal, alternatively, in triggering or activating via the physical layer signaling the UE to report the measurement result of the first reference signal, notify the UE to perform periodic or aperiodic feedback on the first reference signal.

The embodiment of this disclosure further provides a base station, configured with the above resource configuration apparatus 800.

Figure 9:
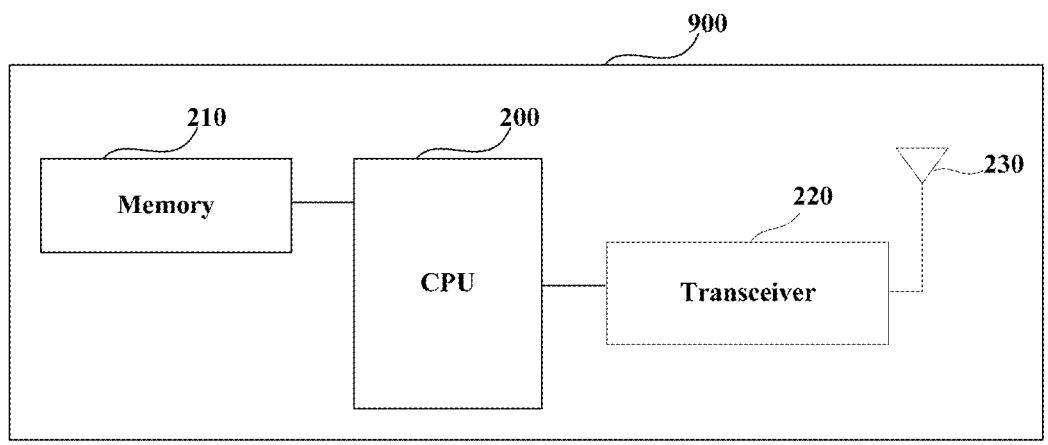
FIG. 9 is a schematic diagram of a structure of the base station of Embodiment 3 of this disclosure.

FIG. 9 is a schematic diagram of the base station of the embodiment of this disclosure. As shown in FIG. 9, the base station 900 may include a central processing unit (CPU) 200 and a memory 210, the memory 210 being coupled to the central processing unit 200. The memory 210 may store various data, and furthermore, it may store a program for information processing, and execute the program under control of the central processing unit 200.

For example, the base station 900 may carry out the resource configuration method of reference signal described in Embodiment 1. And the central processing unit 200 may be configured to carry out the functions of the resource configuration apparatus 800, that is, the central processing unit 200 may be configured to perform the following control: configuring one or more resources for a first reference signal which is precoded with one or more beam weighting coefficients, and configuring one or more resources for a second reference signal which is not precoded with one or more beam weighting coefficients or precoding of which is unknown to a UE; and transmitting one or more resource configurations of the first reference signal and one or more resource configurations of the second reference signal to the UE.

Furthermore, as shown in FIG. 9, the base station 900 may include a transceiver 220, and an antenna 230, etc. Functions of the above components are similar to those in the relevant art, and shall not be described herein any further. It should be noted that the base station 900 does not necessarily include all the parts shown in FIG. 9, and furthermore, the base station 900 may include parts not shown in FIG. 9, and the relevant art may be referred to.

It can be seen from the above embodiment that the base station configures one or more resources for a first reference signal which is precoded with one or more beam weighting coefficients, and configures one or more resources for a second reference signal which is not precoded with one or more beam weighting coefficients or precoding of which is unknown to a UE. Hence, a 3D MIMO system may flexibly support reference signals of multiple types.

Embodiment 4

The embodiment of this disclosure provides a resource configuration apparatus of reference signal, configured in a UE of a 3D MIMO system, with contents identical to those in Embodiment 2 being not going to be described herein any further.

Figure 10:
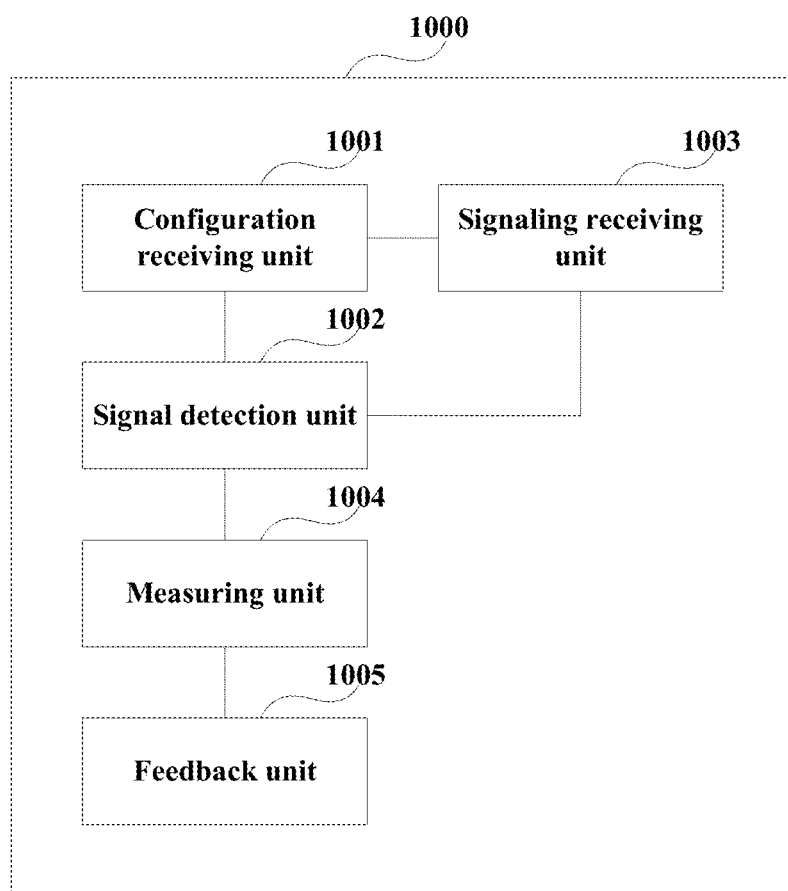
FIG. 10 is a schematic diagram of the resource configuration apparatus of Embodiment 4 of this disclosure.

FIG. 10 is a schematic diagram of the resource configuration apparatus of the embodiment of this disclosure. As shown in FIG. 10, a resource configuration apparatus 1000 includes:

a configuration receiving unit 1001 configured to receive one or more resource configurations of a first reference signal which is precoded with one or more beam weighting coefficients and one or more resource configurations of a second reference signal which is not precoded with one or more beam weighting coefficients or precoding of which is unknown to the UE, transmitted by a base station.

As shown in FIG. 10, the resource configuration apparatus 1000 may further include:

a signal detection unit 1002 configured to detect the first reference signal upon reception of signaling indicating to report a measurement result of the first reference signal after receiving the one or more resource configuration of the first reference signal, and detect the second reference signal when the one or more resource configurations of the second reference signal is received.

As shown in FIG. 10, the resource configuration apparatus 1000 may further include:

a signaling receiving unit 1003 configured to receive signaling for triggering or activating the UE to report the measurement result of the first reference signal;

and the signal detecting unit 1002 is configured to detect the first reference signal again after receiving the signaling.

As shown in FIG. 10, the resource configuration apparatus 1000 may further include:

a measuring unit 1004 configured to perform channel measurement on the first reference signal and/or the second reference signal; and a feedback unit 1005 configured to perform periodic or aperiodic feedback on the second reference signal, and/or, perform periodic or aperiodic feedback on the first reference signal.

In one implementation, for multiple first reference signals, the feedback unit 1005 is configured to select one or more first reference signals of best channel conditions to perform feedback.

In one implementation, for the second reference signal, the feedback unit 1005 is configured to feed back one piece of the following information or any combination thereof: a channel quality indicator, a precoding matrix indicator, and a rank indicator.

In another implementation, for the first reference signal, the feedback unit 1005 is configured to feed back piece of the following information or any combination thereof: beam information, a channel quality indicator, a precoding matrix indicator, and a rank indicator.

In one implementation, the feedback unit 1005 is configured to perform feedback according to the following priorities: aperiodic feedback for the first reference signal, periodic feedback for the first reference signal, aperiodic feedback for the second reference signal, and periodic feedback for the second reference signal;

In another implementation, the feedback unit 1005 is configured to perform feedback according to the following priorities: aperiodic feedback for the first reference signal, aperiodic feedback for the second reference signal, periodic feedback for the first reference signal, and periodic feedback for the second reference signal.

The embodiment of this disclosure further provides a UE, configured with the above resource configuration apparatus 1000.

Figure 11:
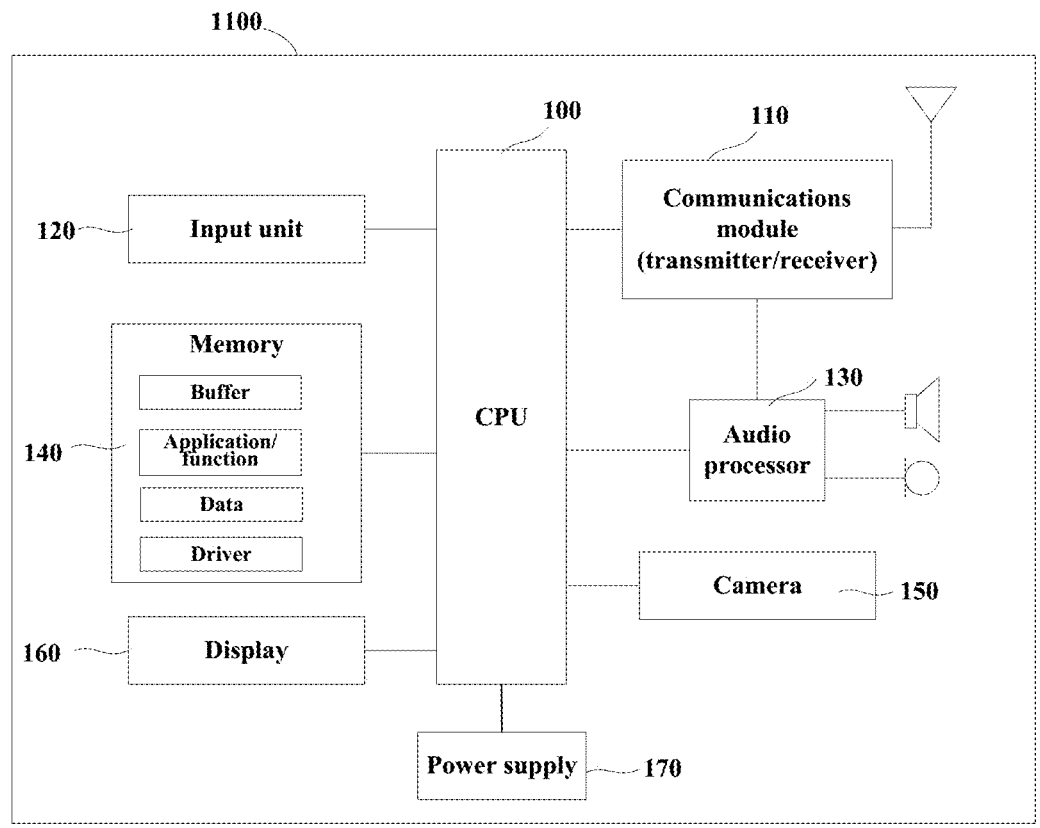
FIG. 11 is a schematic diagram of a structure of the UE of Embodiment 4 of this disclosure.

FIG. 11 is a schematic diagram of the UE of the embodiment of this disclosure. As shown in FIG. 11, the UE 1100 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In an implementation, the functions of the resource configuration apparatus 1000 may be integrated into the central processing unit 100. For example, the central processing unit 100 may be configured to perform following control: receiving one or more resource configurations of a first reference signal which is precoded with one or more beam weighting coefficients and one or more resource configurations of a second reference signal which is not precoded with one or more beam weighting coefficients or precoding of which is unknown to the UE, transmitted by a base station.

In another implementation, the resource configuration apparatus 1000 and the central processing unit 100 may be configured separately. For example, the resource configuration apparatus 1000 may be configured as a chip connected to the central processing unit 100, with its functions being realized under control of the central processing unit 100.

As shown in FIG. 11, the UE 1100 may further include a communications module 110, an input unit 120, an audio processor 130, a memory 140, a camera 150, a display 160 and a power supply 170. Functions of the above components are similar to those in the relevant art, and shall not be described herein any further. It should be noted that the UE 1100 does not necessarily include all the parts shown in FIG. 11, and furthermore, the UE 1100 may include parts not shown in FIG. 11, and the relevant art may be referred to.

It can be seen from the above embodiment that the UE receives one or more resources configured by the base station for the first reference signal which is precoded with one or more beam weighting coefficients, and one or more resources configured by the base station for the second reference signal which is not precoded with one or more beam weighting coefficients or precoding of which is unknown to the UE. Hence, a 3D MIMO system may flexibly support reference signals of multiple types.

Embodiment 5

Figure 12:
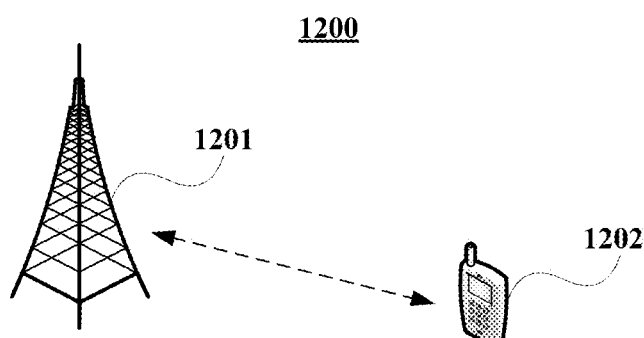
FIG. 12 is a schematic diagram of the communications system of Embodiment 5 of this disclosure.

The embodiment of this disclosure further provides a communications system, with contents identical to those in embodiments 1-4 being not going to be described herein any further. FIG. 12 is a schematic diagram of the communications system of the embodiment of this disclosure. As shown in FIG. 12, the communications system 1200 includes: a base station 1201 and a UE 1202.

The base station 1201 is configured to configure one or more resources for a first reference signal which is precoded with one or more beam weighting coefficients, configure one or more resources for a second reference signal which is not precoded with one or more beam weighting coefficients or precoding of which is unknown to a UE, and transmit one or more resource configurations of the first reference signal and one or more resource configurations of the second reference signal.

And the UE 1202 is configured to receive the one or more resource configurations of the first reference signal and the one or more resource configurations of the second reference signal.

In this embodiment, the first reference signal and the second reference signal may be distinguished by one piece of the following information or any combination thereof: a time-frequency resource position, a period and a port.

In this embodiment, the base station is configured to transmit the first reference signal by signaling triggering or activation after transmitting the one or more resource configurations of the first reference signal, and transmit the second reference signal in transmitting the one or more resource configurations of the second reference signal.

In this embodiment, the base station may further be configured to transmit signaling for triggering or activating the UE to report a measurement result of the first reference signal.

An embodiment of the present disclosure provides a computer readable program code, which, when executed in a base station, will cause a computer unit to carry out the resource configuration method of reference signal described in Embodiment 1 in the base station.

An embodiment of the present disclosure provides a computer readable medium, including a computer readable program code, which will cause a computer unit to carry out the resource configuration method of reference signal described in Embodiment 1 in a base station.

An embodiment of the present disclosure provides a computer readable program code, which, when executed in a UE, will cause a computer unit to carry out the resource configuration method of reference signal described in Embodiment 2 in the UE.

An embodiment of the present disclosure provides a computer readable medium, including a computer readable program code, which will cause a computer unit to carry out the resource configuration method of reference signal described in Embodiment 2 in a UE.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or blocks as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communications combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A base station comprising:
a processor configured to execute instructions to configure one or more resources for a first reference signal which is precoded with one or more beam weighting coefficients, and to configure one or more resources for a second reference signal which is not precoded with one or more beam weighting coefficients or precoding of which is unknown to a UE (user equipment); and
transmitter configured to transmit one or more resource configurations of the first reference signal and one or more resource configurations of the second reference signal to the UE,
wherein the transmitter is configured to trigger or activate the first reference signal by transmitting an activation of channel state information reference signal (CSI-RS) resources media access control (MAC) control element (CE) after transmitting the one or more resource configurations of the first reference signal, and to transmit the second reference signal while transmitting the one or more resource configurations of the second reference signal.

2. The base station according to claim 1, wherein the number of the first reference signal is one or more, and the number of the second reference signal is one or more; and the first reference signal and the second reference signal are distinguished by one piece of the following information or any combination thereof: a time-frequency resource position, a period and a port.

3. The base station according to claim 1, wherein,
the transmitter is configured to transmit signaling for triggering or activating the UE to report a measurement result of the first reference signal.

4. The base station according to claim 3, wherein the transmitter is configured to periodically transmit the second reference signal, and the transmitter is configured to periodically or aperiodically transmit the first reference signal.

5. The base station according to claim 4, wherein the transmitter is configured to trigger or activate the UE to report a measurement result of the first reference signal, via media access control (MAC) layer signaling or physical layer signaling.

6. The base station according to claim 5, wherein the transmitter is further configured to, while triggering or activating via the MAC layer signaling the UE to report the measurement result of the first reference signal, notify the UE to perform periodic or aperiodic feedback on the first reference signal;
or, while triggering or activating via the physical layer signaling the UE to report the measurement result of the first reference signal, notify the UE to perform periodic or aperiodic feedback on the first reference signal.

7. The base station according to claim 3, wherein the transmitter is further configured to notify the UE via high-layer signaling to perform periodic feedback on the second reference signal, or notify the UE via physical layer signaling to perform aperiodic feedback on the second reference signal.

8. The base station according to claim 1, wherein the transmitter is configured to transmit the one or more resource configurations of the first reference signal and the one or more resource configurations of the second reference signal via high-layer signaling.

9. A user equipment (UE) comprising:
a receiver configured to receive one or more resource configurations of a first reference signal which is precoded with one or more beam weighting coefficients and one or more resource configurations of a second reference signal which is not precoded with one or more beam weighting coefficients or precoding of which is unknown to the UE, transmitted by a base station; and
a processor configured to execute instructions to detect the first reference signal upon reception of signaling for indicating to report a measurement result of the first reference signal after receiving the one or more resource configurations of the first reference signal, and to detect the second reference signal when the one or more resource configurations of the second reference signal is received.

10. The UE according to claim 9, wherein,
the receiver is configured to receive signaling for triggering or activating the UE to report the measurement result of the first reference signal;
and the processor is configured to execute the instructions to detect the first reference signal again after receiving the signaling.

11. The UE according to claim 9, wherein the processor is further configured to execute the instructions to:
perform channel measurement on the first reference signal and/or the second reference signal; and
perform periodic or aperiodic feedback on the second reference signal, and/or, perform periodic or aperiodic feedback on the first reference signal.

12. The UE according to claim 11, wherein for multiple first reference signals, the processor is further configured to execute the instructions to select one or more first reference signals of best channel conditions to perform feedback.

13. The UE according to claim 11, wherein for the second reference signal, the processor is further configured to execute the instructions to feed back one piece of the following information or any combination thereof: a channel quality indicator, a precoding matrix indicator, and a rank indicator;
and for the first reference signal, the processor is further configured to execute the instructions to feed back piece of the following information or any combination thereof: beam information, a channel quality indicator, a precoding matrix indicator, and a rank indicator.

14. The UE according to claim 11, wherein the processor is further configured to execute the instructions to perform feedback according to the following priorities:
aperiodic feedback for the first reference signal, periodic feedback for the first reference signal, aperiodic feedback for the second reference signal, and periodic feedback for the second reference signal;
or,
aperiodic feedback for the first reference signal, aperiodic feedback for the second reference signal, periodic feedback for the first reference signal, and periodic feedback for the second reference signal.

15. A communications system, comprising:
a base station, wherein the base station comprises a memory that stores a plurality of instructions, a processor that couples to the first memory and is configured to execute the instructions to configure one or more resources for a first reference signal which is precoded with one or more beam weighting coefficients, to configure one or more resources for a second reference signal which is not precoded with one or more beam weighting coefficients or precoding of which is unknown to a User Equipment, (UE), and a transmitter configured to transmit one or more resource configurations of the first reference signal and one or more resource configurations of the second reference signal; and
the UE, wherein the UE comprises a receiver configured to receive the one or more resource configurations of the first reference signal and the one or more resource configurations of the second reference signal;
wherein the transmitter is configured to trigger or activate the first reference signal by transmitting an activation of channel state information reference signal (CSI-RS) resources media access control (MAC) control element (CE) after transmitting the one or more resource configurations of the first reference signal, and to transmit the second reference signal while transmitting the one or more resource configurations of the second reference signal.

16. The communications system according to claim 15, wherein the number of the first reference signal is one or more, and the number of the second reference signal is one or more;
and the first reference signal and the second reference signal are distinguished by one piece of the following information or any combination thereof: a time-frequency resource position, a period and a port.

17. The communications system according to claim 15, wherein the transmitter is further configured to transmit signaling for triggering or activating the UE to report a measurement result of the first reference signal.

* * * * *